United States Patent [19]

Liu et al.

[11] 4,437,799
[45] Mar. 20, 1984

[54] PIPELINE TRANSPORTATION SYSTEM

[75] Inventors: Henry Liu; Donald L. Gibson; David H. S. Cheng; James E. Rathke, all of Columbia, Mo.

[73] Assignee: The Curators of the University of Missouri, Columbia, Mo.

[21] Appl. No.: 51,493

[22] Filed: Jun. 25, 1979

Related U.S. Application Data

[63] Continuation of Ser. No. 839,254, Oct. 4, 1977, abandoned.

[51] Int. Cl.³ .............................................. B65G 51/04
[52] U.S. Cl. .................... 406/198; 406/110; 406/127; 406/184; 406/195
[58] Field of Search ........... 104/138 R, 148 LM, 154; 198/619; 310/11, 12, 13, 14; 417/50; 406/10, 19, 85, 106, 108–112, 122, 127, 147, 148, 150, 176, 198, 195, 184

[56] References Cited

U.S. PATENT DOCUMENTS

| 282,165 | 7/1883 | Cheever | 310/14 |
| 1,797,864 | 3/1931 | Harlandt | 198/619 X |
| 2,698,127 | 12/1954 | Bowlus | 417/50 X |
| 3,611,783 | 10/1971 | Mittelman | 310/14 X |
| 3,633,976 | 1/1972 | Kruyer | 406/112 |

Primary Examiner—James L. Rowland
Attorney, Agent, or Firm—Senniger, Powers, Leavitt and Roedel

[57] ABSTRACT

A hydraulic capsule pipelining system including a pipeline adapted for flow therethrough of water or other carrier liquid to propel cargo-containing capsules through the pipeline, and means for pumping the liquid through the pipeline utilizing a segment of length of the pipeline as a pump cylinder and utilizing capsules passing through said pump cylinder segment of the pipeline as pistons in said segment for pumping the liquid forward through the pipeline, capsules being propelled through said segment by an externally produced electromagnetic field.

1 Claim, 5 Drawing Figures

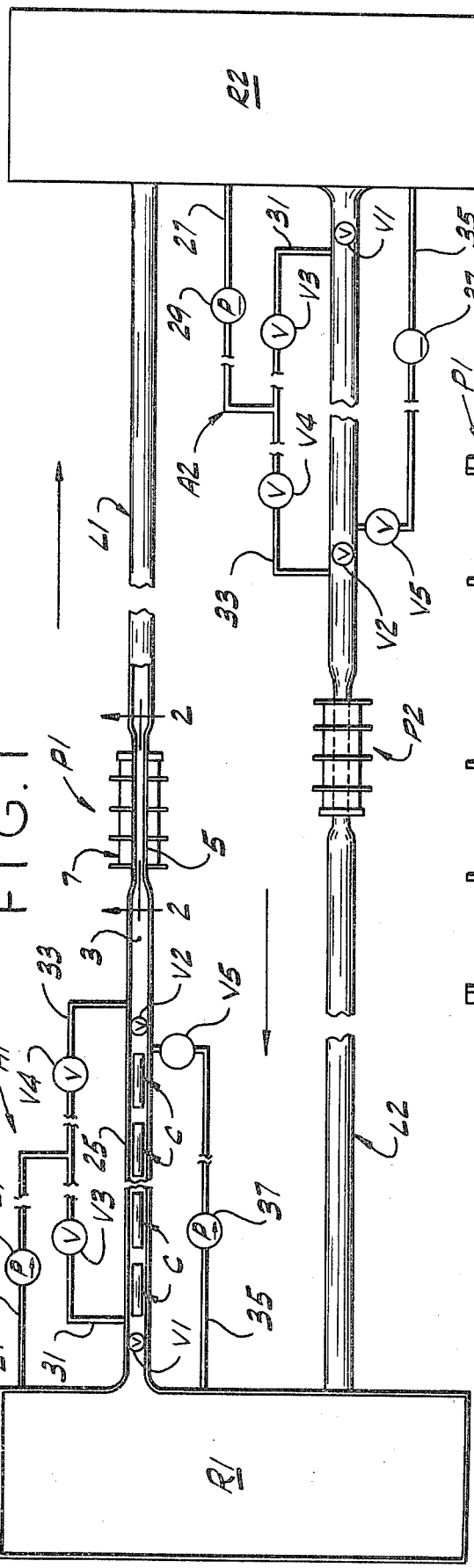
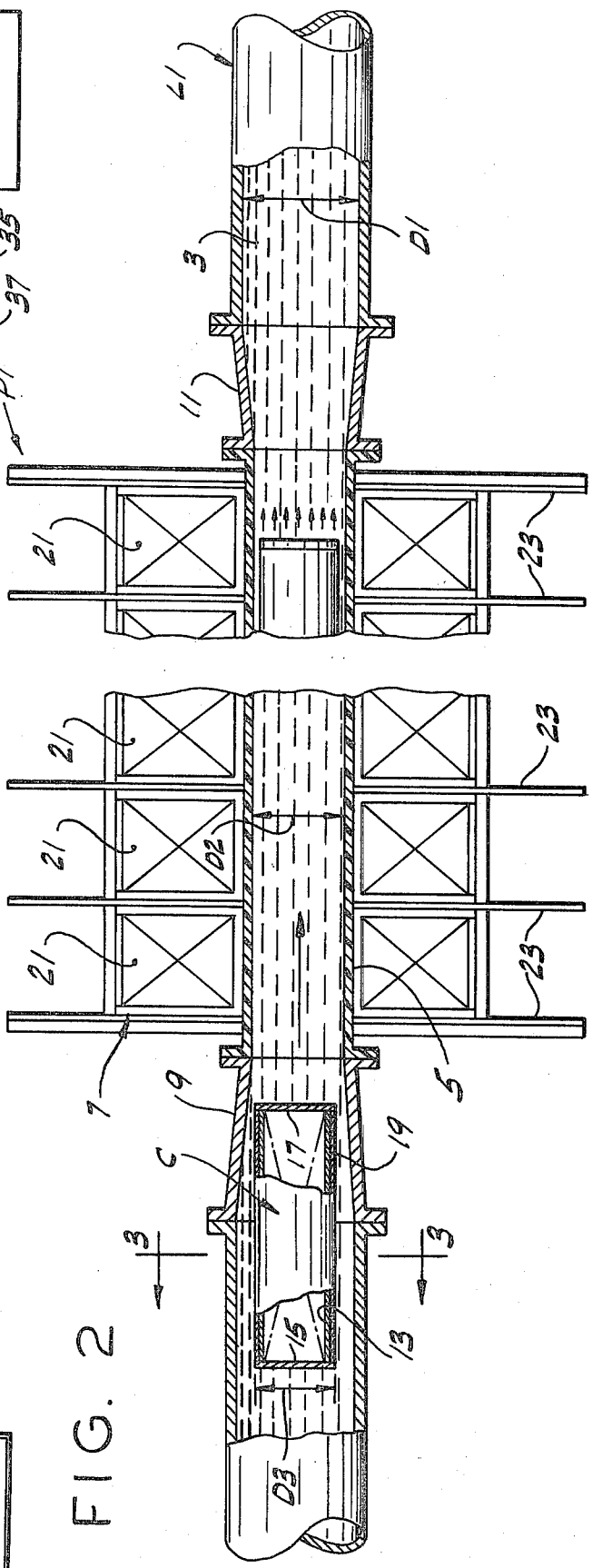

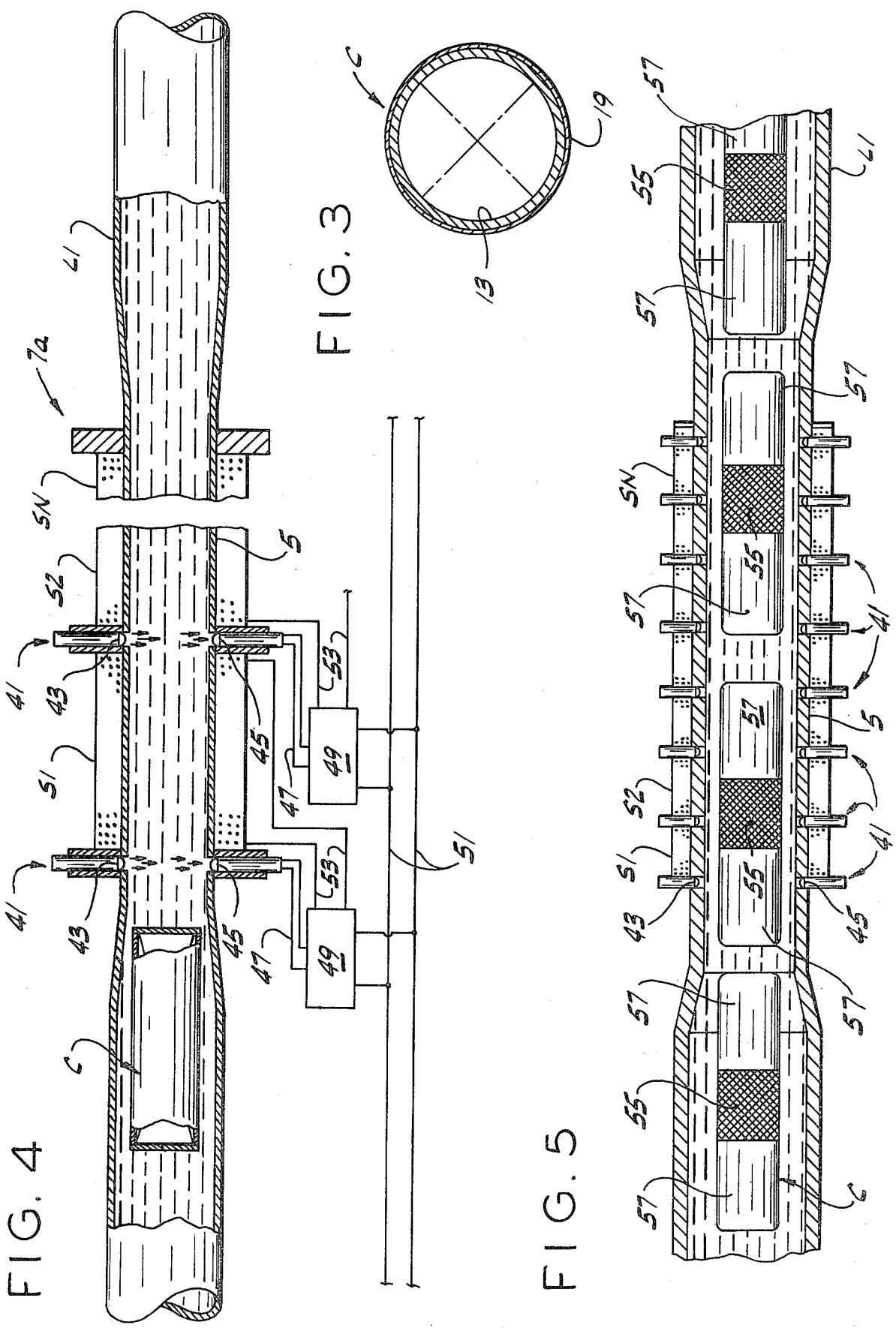

4,437,799

PIPELINE TRANSPORTATION SYSTEM

This is a continuation of application Ser. No. 839,254, filed Oct. 4, 1977, now abandoned.

BACKGROUND OF THE INVENTION

This invention relates to pipeline transportation systems, and more particularly to a system for the transportation of cargo in containers through a pipeline via hydraulic propulsion of the containers through the pipeline.

Reference may be made to such U.S. Patents as Nos. 3,325,222, 3,328,089, 3,333,901, 3,339,984, 3,556,604 and 3,633,976 disclosing systems of the above-mentioned type, referred to as hydraulic capsule pipelining (HCP) systems.

In such systems, means is provided for pumping a carrier liquid, usually water, through a pipeline, the flow of the liquid being utilized to propel the cargo-carrying containers, which are referred to as capsules, through the pipeline. The containers or capsules, which are generally of elongate cylindrical shape, travel endwise through the pipeline, the diameter of each capsule generally being 5-10% smaller than the internal diameter of the pipe. Each capsule may be provided with a collar, as disclosed in U.S. Pat. No. 3,633,976, to cause the capsule to move in a "nose-up" position at a small angle of attack to increase the hydrodynamic lift on the capsule, thereby providing for lifting the capsule (the density of which is generally greater than that of the waer or other carrier liquid) up off the bottom of the pipeline to increase the velocity of the capsule and decrease the energy loss along the pipe. Under optimum conditions, the capsule moves at a speed slightly greater than the mean flow velocity of the carrier liquid.

In view of the requirement of a hydraulic capsule pipelining system that the capsules must pass relatively freely through the pipeline, the pumping of the carrier liquid through the pipeline has presented serious problems. The requirement is satisfied only by the provision of a special pump in the line capable of having capsules pass therethrough one after another, or the provision of a pumping system which the capsules may by-pass in their travel through the line. Prior special pumps and by-pass systems for the purpose have presented special problems. Thus, the special pump shown in U.S. Pat. No. 3,325,222, which has been referred to as the vortex pump, while quite simple and quite capable of freely passing the capsules, has low efficiency and low pump head. It is understood that the best efficiency obtained to date for this pump is only 15% with a corresponding head of only a few feet for each pump. Another special pump proposed for the purpose, referred to as the rotary-vane pump, comprises a rotor having compartments (between vanes) for receiving capsules exiting from one section of a line and entering the capsules in another section of the line, with provision for delivery of carrier liquid from a centrifugal pump to the rotary-vane pump and discharge of carrier liquid from the rotary-vane pump to the inlet of the centrifugal pump. This, however, has the disadvantage of being bulky (e.g., it has to be made forty feet in diameter to handle capsules fifteen feet long). By-pass systems such as shown in U.S. Pat. No. 3,339,984 have the disadvantage of requiring rapid opening and closing of valves, which causes undesirable large surges of pressure in the pipeline.

SUMMARY OF THE INVENTION

Among the several objects of this invention may be noted the provision of a hydraulic capsule pipelining system having an improved in-line pumping system, as distinguished from a by-pass system, which allows for relatively free passage of capsules therethrough, and which effects pumping of the carrier liquid through the pipeline at increased efficiency, thereby conserving energy and capable of producing high pump head, without being bulky; and the provision of such a system which may operate without undue pressure surges.

In general, a pipeline transportation system of this invention comprises a pipelne adapted for flow therethrough of a carrier liquid, e.g., water, capsules adapted to be transported through the pipeline by the carrier liquid flowing through the pipeline, and means for pumping the carrier liquid through the pipeline in the direction for transport of the capsules. The pumping means comprises at least one segment of length of the pipeline constituting a pump cylinder, and there may be a plurality of such cylinders spaced at intervals along the length of the pipeline. The capsules are adapted to pass endwise through the pump cylinder from one end thereof to the other, and at least some of the capsules have a relatively close fit in the cylinder to act as pistons in the cylinder for pumping the carrier liquid through the pipeline. Generally, each of the capsules used in the system is adapted to act as a piston in the cylinder, but it is possible that only some of the capsules less than all may be utilized as pistons for the pumping of the carrier liquid. Means is provided for driving the capsules acting as pistons through the cylinder in the stated direction for pumping the carrier liquid in that direction, this means comprising electrically energized means along said cylinder for producing an electromagnetic field in said cylinder for linear propulsion of said capsules acting as pistons through said cylinder in said direction in respose to said field.

Other objects and features will be in part apparent and in part pointed out hereinafter.

BRIEF DESCRIPTION OF THE DRAWINGS

FIG. 1 is a plan of a hydraulic capsule pipelining system of this invention, broken away to reduce the length of the view;

FIG. 2 is an enlarged longitudinal section on line 2—2 of FIG. 1, showing a pumping means of this invention in the system;

FIG. 3 is a transverse section on line 3—3 of FIG. of a capsule used in the FIG. 2 system;

FIG. 4 is a view similar to FIG. 2 showing an alternate pumping means; and

FIG. 5 is a view similar to FIG. 4 showing a modification.

Corresponding reference characters indicate corresponding parts throughout the several views of the drawings.

DESCRIPTION OF THE PREFERRED EMBODIMENTS

Referring to FIG. 1 of the drawings, a pipeline transportation system of this invention is shown to comprise a pipeline designated L1 adapted for flow therethrough of a carrier liquid 3, e.g., water, from a first reservoir R1 to a second reservoir R2, and capsules C adapted to be transported through the first pipeline L1 from the reservoir R1 to the reservoir R2 by the carrier liquid flowing through the pipelne from the reservoir R1 to the reservoir R2. At L2 is indicated a second pipeline, which may be referred to as an optional return pipeline, for flow therethrough of the carrier liquid back to the reservoir R1 from the reservoir R2, for return of the capsules C to the reservoir R1 through the pipeline L2 by the carrier liquid flowing through the pipeline L2 from the reservoir R2 to the reservoir R1. At P1 in line L1 is indicated means for pumping the carrier liquid through line L1 in the direction (left to right as illustrated in FIG. 1) for transport of the capsules C from the reservoir R1 to the reservoir R2, and at P2 in line L2 is indicated means (which may be identical to means P1) for pumping the carrier liquid through line L2 in the direction (right to left as illustrated in FIG. 1) for transport of the capsules C from the reservoir R2 to the reservoir R1. At A1 is indicated a means for injecting capsules from reservoir R1 into line L1 for transport through line L1 to reservoir R2, and at A2 is indicated a means (which may be indentical to means A1) for injecting capsules from reservoir R2 into line L2 for transport through line L2 to reservoir R1.

In accordance with this invention, the pumping means P1 in line L1 comprises a segment of length 5 of the pipeline constituting a pump cylinder, the capsules C being adapted to pass endwise through this cylinder 5 from one end thereof to the other in the direction for transport of the capsules (from the left end to the right end of said cylinder as shown in FIGS. 1 and 2), at least some of the capsules having a relatively close fit in said cylinder to act as pistons in said cylinder for pumping the carrier liquid 3 through the cylinder. And means indicated generally at 7 is provided for driving the capsules which have a close fit in said cylinder (to act as pistons therein) through said cylinder in the direction of transport of the capsules for pumping the carrier liquid in said direcion. As will appear, this driving means comprises electrically energized means along the cylinder 5 for producing an electromagnetic field in said cylinder for linear propulsion of said capsules acting as pistons through said cylinder in said direction in response to said field.

The pipeline L1 is generally constructed of suitable lengths of pipe, e.g., steel pipe, of generally uniform internal diameter D1 throughout its length, except for the pump cylinder 5, which is of reduced diameter D2 relative to the pipeline. It extends continuously from the reservoir R1 to the reservoir R2 for flow of the carrier liquid and passage of the capsules C therethrough, the capsule injection means A1 being operated at suitable intervals for transfer of capsules from an entry section of the pipeline into the pipeline as will appear. Noting that the internal diameter D2 of the pump cylinder segment 5 of the pipeline is smaller than the internal diameter D1 of the pipeline elsewhere, the pipeline is formed with a gradual transition 9 from diameter D1 to D2 at the inlet end of the cylinder 5, which is its left end as viewed in FIG. 2. This transition is shown as a tubular frusto-conical segment. The pipeline is also shown as formed with a similar transition 11 at the exit end of the cylinder.

As herein illustrated, the capsules C are all identical, each comprising an elongate cylindrical container having an external diameter D3 from about 5% to about 10% smaller than the internal diameter D1 of the pipeline, and having a length about five times its diameter.* It is contemplated that the capsules may be one foot in diameter and five feet long, for example, or three feet in diameter and fifteen feet long. In the case of one-foot diameter capsules, the pipeline may be about 1.05–1.10 feet in internal diameter. Generally, a capsule will comprise a hollow cylindrical body 13 (e.g., a length of pipe) with suitable closures 15 and 17 at its ends, one or both of which is suitably removable. Each capsule may be provided with a collar, as shown in U.S. Pat. No. 3,633,976, for increasing the hydrodynamic lift on the capsule and thus increasing its payload.

*Note that much longer capsules can be used if the pipe does not contain bends.

In the case of capsules without a collar, the internal diameter D2 of the pump cylinder 5 is established as slightly greater than the external diameter of the capsule, and in the case of capsules with a collar, the internal diameter of the pump cylinder 5 is established as slightly greater than the external diameter of the collar, for a relatively close fit of the capsules in the cylinder 5.

Referring to FIG. 2, the driving means 7 for the capsules C is shown to be such as to act as a linear induction motor for propulsion of the capsules through the cylinder 5. For this purpose, each capsule is electrically conductive on its cylindrical surface, and here it is preferred that the body 13 of each capsule be made of ferromagnetic material such as steel or cast iron, covered on the outside with a material of higher electrical conductivity, such as copper or aluminum, as indicated at 19 in FIGS. 2 and 3. The good electric conductor may be applied as a coating or in any other suitable manner to the steel or cast iron body or shell 13 of the capsule. The pump cylinder segment 5 of the pipeline L1 is electrically nonconductive, consisting of a length of nonmetallic pipe, formed of a suitable nonconductive synthetic resin material, for example. The driving means 7 comprises a linear induction motor coil means surrounding the cylinder 5, this coil means being shown in FIG. 2 as comprising a set of series-connected stator coils 21 positioned side-by-side on the cylinder along the length of the cylinder, with cooling fins 23 for the coils. The cylinder 5 may consist, for example, of a plastic pipe having a length about 20 times the length of a capsule. The coil means is adapted to be energized by an a.c. source, e.g., a multiphase source such as a three-phase source, to produce an electromagnetic field operable to move a capsule C linearly through the cylinder 5 from its entry end to its exit end.

Referring to FIG. 1, the capsule injecting means A1 is shown as involving a section 25 of the pipeline between a valve V1 adjacent the reservoir R1 and a valve V2 spaced downstream from valve V1 a distance such as to accommodate a plurality of capsules C between the valves. A line 27 extending from reservoir R1 and including a pump 29 has a branch line 31 including a valve V3 extending to a point just downstream from valve V1 and a branch line 33 including a valve V4 extending to a point just downstream from valve V2. A line 35 including a valve V5 and a suction pump 37 extends from the downstream end of the lock 25 back to the reservoir R1. The arrangement is such that with valves V1 and V5 open and V2 closed, suction pump 37 may be operated to draw capsules C into the lock 25. During this operation, valve V3 is closed, valve V4 is open, and pump 29 is operated to pump carrier liquid from the reservoir R1 into the line L1 to maintain a supply of the carrier liquid from the reservoir R1 to the line L1, if pumping is needed for this purpose. Capsules which have been drawn into the lock 25 are released for entry into the line L1 downstream from the lock by closing valves V1, V4 and V5 and opening valves V2 and V3, the train of capsules in the lock moving forward past valve V2.

In the operation of the system including the linear induction motor means of FIG. 2 for pumping the carrier liquid through the pipeline L1, a plurality of capsules C are drawn into the lock 25 as above described to form a train of capsules in the lock. The train is released from the lock and travels downstream in line L1, via downstream flow through the lock of carrier liquid 3 entering the upstream end of the lock via lines 27 and 31 and valve V3. The first capsule of the train enters the cylinder 5 and is driven through the cylinder 5 in response to the electromagnetic field produced in the cylinder by the linear induction motor coil means 7. The capsule, having a relatively close fit in the cylinder, acts as a piston to pump the carrier liquid ahead of the capsule forward in the cylinder and out the exit end of the cylinder into the pipeline downstream from the cylinder. The capsule passes relatively freely through the cylinder, exits from the exit (right) end of the cylinder and continues on downstream in the pipeline. Each successive capsule entering the cylinder acts as a piston in the same manner to pump the carrier liquid forward through the pipeline. Thus, a downstream flow of the carrier liquid is maintained in the pipeline for the transport of the capsules through the pipeline. The capsules may have a specific gravity as specified in U.S. Pat. No. 3,633,976, and generally will have a specific gravity somewhat greater than 1.

Capsules are introduced into the lock 25 from the reservoir R1 by suitable handling equipment. A train of capsules is formed in the lock after each preceding train has been released for passage through the pumping means P1 and travel through the line L1 to the reservoir R2. Capsules fed into the reservoir R2 are retrieved by suitable handling equipment, unloaded, and returned to reservoir R1 either empty or with a return load via the return line L2. Capsules are injected from reservoir R2 into line L2 via the injecting means A2, which is the same as the injecting means A1, and a downstream (right to left) flow of carrier liquid 3 is maintained in line L2 by the pumping means P2, which is the same as the pumping means P1. The injecting means A1 and A2 shown are only by way of example; other suitable injecting means may be used. It will be observed that while in the use of injecting means A1 (or A2) the pump V4 may be operated to supply carrier liquid from the reservoir R1 (or R2) to the pipeline L1 (or L2), this pump is not relied on for causing the capsule-transporting flow of the carrier liquid through the line; it is the pumping means P1 (or P2) which does this. AND pumping means P1 (or P2), while being a direct inline pumping system, as distinguished from a by-pass system, allows for free passage of capsules therethrough (cylinder 5 is unobstructed), is not bulky, can generate high pump head, and enables operation without undue pressure surges.

FIG. 4 shows an alternative embodiment of the means for driving the capsules through the cylinder 5. Here the driving means, designated 7a to distinguish it from the linear induction motor driving means 7 of FIG. 2, acts as a solenoid (d.c. energized) motor, as distinguished from a linear induction (a.c. energized) motor. For the solenoid motor type of operation, the capsules C must be ferromagnetic, either by being made of ferromagnetic material (e.g., steel of cast iron) or by having their cargo ferromagnetic in whole or in part. It is contemplated that each capsule may be made wholly of ferromagnetic material (e.g., steel or cast iron), or in part of such material and in part of nonferromagnetic material (e.g., plastic or aluminum). Surrounding the pump cylinder 5 which may be made of insulator or other nonmagnetic materials in this case, is a solenoid coil means constituting the driving means 7a, comprising a series of individual solenoid coils, the first coil in the series being designated S1, the next S2 and the last being indicated at SN. These coils are spaced at intervals along the length of the cylinder 5 with spaces between adjacent coils. At the upstream end of the first coil S1 and between the successive coils are sensor systems each designated 41 for sensing the passage thereby of each end of a capsule C in the cylinder 5. Each sensor system, as illustrated, is an optical sensor system comprising a lamp 43 directing a beam of light across the cylinder to a photocell 45, the arrangement being such that the beam is cut off from the photocell to deactivate the photocell as the forward end of a capsule passes between the lamp and the photocell, the photocell remaining deactivated until the rear end of the capsule passes by the lamp and photocell and then being activated until the forward end of the next capsule passes by. The photocells 45 are connected as indicated at 47 to control means 49 for energizing and deenergizing each coil S1 etc. in response to the deactivation and activation of the photocells, a power line for the coils being indicated at 51 and interconnections between the control means and the coils being indicated at 53. The arrangement is such that as the forward end of a capsule cuts off the beam to the photocell 45 of the first sensor system 41, the first coil S1 is energized, thereby establishing an electromagnetic field which drives the capsule C forward through the cylinder 5 in the zone of the first coil. The first coil S1 remains energized until the rear end of the capsule passes by the first sensor system 41, activating its photocell and effecting deenergization of the first coil. At or about this point, the forward end of the capsule intercepts the beam of the second sensor system 41. This effects energization of the second coil S2, establishing an electromagnetic field which drives the capsule forward through the cylinder 5 in the zone of the second coil. The second coil S2 remains energized until the rear end of the capsule passes by the second sensor system 41, activating its photocell and effecting the energization of the second coil. At or about this point, the forward end of the capsule intercepts the beam of the third sensor system, and this effects energization of the third coil, and so on throughout the series of coils and sensors. Thus, the coils are energized and deenergized in sequence magnetically to propel the capsules C through the cylinder 5 for the pumping of the carrier liquid.

In the operation of the FIG. 4 solenoid motor type system for propulsion of the capsules C, it is important to prevent the simultaneous attraction by any one of the solenoid coils of two capsules (one being attracted forward and the other rearward) since this would bring the train of capsules in the pipeline to a halt. This condition may be avoided by having the capsules adequately spaced from one another in passing through the cylinder 5, or by interposing one or more nonferromagnetic capsules between successive ferromagnetic capsules, or by making a segment of each capsule non-ferromagnetic, e.g., by making each capsule with a ferromagnetic segment of length and at least one nonferromagnetic segment of length.

FIG. 5 illustrates a modification of the FIG. 4 system, wherein each capsule has a central ferromagnetic segment 55 and nonferromagnetic end segments. In this system, the sensor systems 41 are spaced at intervals generally corresponding to the width of the segment 55 and the coils S1, S2 etc., each having a corresponding width. In this system, interruption of the beam of light to a photocell 45 effects energization of the coil immediately downstream from that photocell to be energized and deenergization of the preceding coil. It is also contemplated that lasers may be used at 43.

While only one pumping means P1 is shown in line L1 and one pumping means P2 is shown in line L2, it will be understood that each line may have a plurality of pumping means therein at intervals along its length. It will also be observed that the cylinder 5 of each pumping means is of short length relative to the overall length of the pipeline.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a hydraulic capsule pipelining system comprising a pipeline adapted for flow therethrough of a carrier liquid, and cargo-carrying capsules adapted to be transported through the pipeline by the carrier liquid, and cargo-carrying capsules adpated to be transported through the pipeline by the carrier liquid flowing through the pipeline; means for pumping the carrier liquid through the pipeline in the direction for transport of the capsules, said pumping means comprising at least one segment of length of the pipeline constituting a pump cylinder, the capsules being transported through the pipeline being adapted to pass endwise through said pump cylinder from one end thereof to the other and at least some of the capsules having a relatively close fit in said pump cylinder to act as pistons in said pump cylinder for pumping the carrier liquid through the pipeline in the direction for transport of the capsules, and means for driving said close-fitting capsules acting as pistons through said pump cylinder in said direction for pumping the carrier liquid in said direction, said driving means comprising electrically energized means along said pump cylinder for producing an electromagnetic field in said pump cylinder for linear propulsion of said close-fitting capsules acting as pistons through said pump cylinder in said direction in response to said field, said close-fitting capsules acting as pistons forcing the carrier liquid ahead of them through the pump cylinder as they are driven through said pump cylinder by said driving means, said driving means comprising coil means surrounding said cylinder and means for supplying said coil means with multiphase alternating current, at least the surface of the capsules acting as pistons being electrically conductive, the driving means acting as a linear induction motor for propulsion of the capsules acting as pistons through the cylinder, said pump cylinder being electrically nonconductive, of short length relative to the overall length of the pipeline, its internal diameter being smaller than the internal diameter of the pipeline and such as to provide a relatively close fit for the capsules acting as pistons, and there being a gradual transition from the internal diameter of the pipeline to the internal diameter of the cylinder at the inlet end of the cylinder, each capsule being formed to act as a piston in the cylinder and comprising a cargo-carrying cylindrical container of ferromagnetic material covered on the outside with a material of higher electrical conductivity.

* * * * *